United States Patent
Thompson

(10) Patent No.: US 7,284,422 B1
(45) Date of Patent: Oct. 23, 2007

(54) FLUID LEVEL MEASUREMENT DEVICE

(76) Inventor: Douglas A. Thompson, 3074 Fermanagh Dr., Tallahassee, FL (US) 32309-3333

( * ) Notice: Subject to any disclaimer, the term of this patent is extended or adjusted under 35 U.S.C. 154(b) by 217 days.

(21) Appl. No.: 11/226,880

(22) Filed: Sep. 15, 2005

(51) Int. Cl.
G01C 13/00 (2006.01)
G01F 23/30 (2006.01)

(52) U.S. Cl. .................. 73/170.29; 73/305; 73/319; 73/322

(58) Field of Classification Search ............ 73/170.29, 73/170.31, 305, 309, 310, 312, 319, 322
See application file for complete search history.

(56) References Cited

U.S. PATENT DOCUMENTS

| 191,171 | A | * | 5/1877 | Johnston .................... 184/50.1 |
| 2,939,125 | A | | 5/1960 | Swanson |
| 3,880,109 | A | * | 4/1975 | Festa ........................ 116/229 |
| 4,092,861 | A | | 6/1978 | Fling |
| 5,103,673 | A | | 4/1992 | Sawada et al. |
| 5,551,290 | A | | 9/1996 | Spiegel |
| 5,586,466 | A | | 12/1996 | Steiner |

FOREIGN PATENT DOCUMENTS

JP 58-169032 * 10/1983

* cited by examiner

Primary Examiner—Michael Cygan
(74) Attorney, Agent, or Firm—Peter Loffler

(57) ABSTRACT

A device measures the high and low fluid levels of a fluid body. A housing has a shaft with a buoyant weight, the shaft protruding through a cap on the housing's top and capable of sliding through the cap. A first ring encompasses the shaft and is initially positioned immediately below the cap, while a second ring is positioned immediately above the cap. As fluid enters the housing, the shaft rises in lockstep with the fluid level causing the first ring to be pushed downwardly on the shaft and when the fluid level falls, the shaft falls causing the second ring to be pushed upwardly along the shaft. The distance between the rings is the amount of fluid level variation. A debris tube attached to the housing measures the upper limit of fluid level. Subtracting the amount of variation from this upper limit yields the lower fluid level limit.

16 Claims, 2 Drawing Sheets

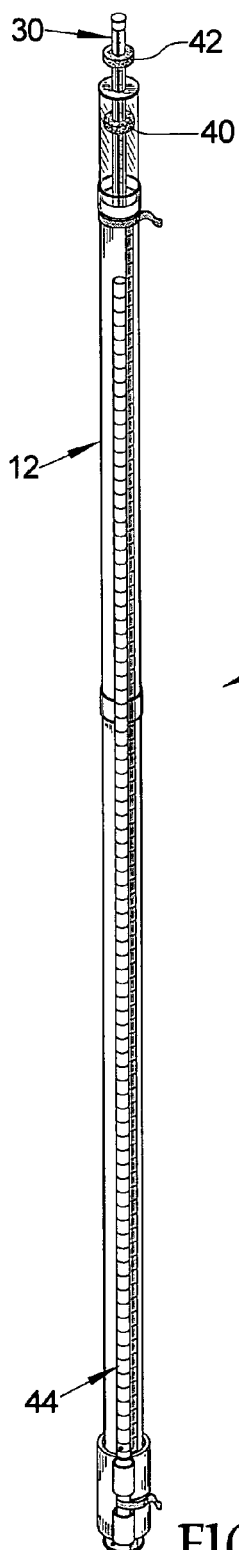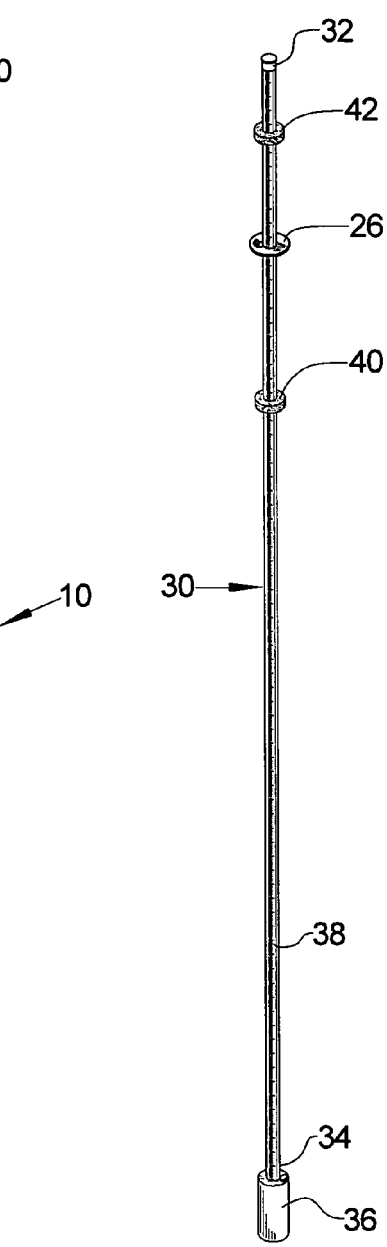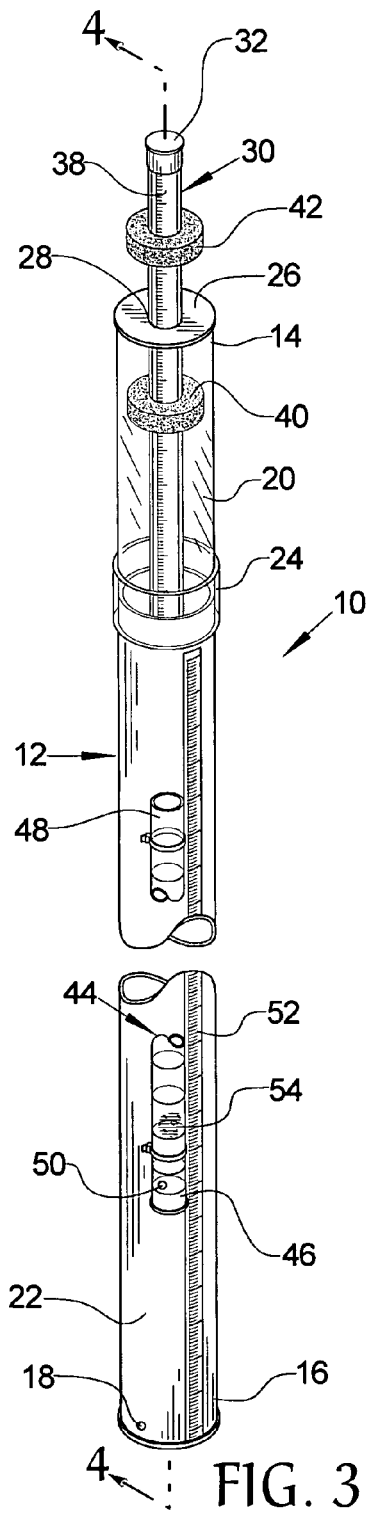

FLUID LEVEL MEASUREMENT DEVICE

BACKGROUND OF THE INVENTION

1. Field of the Invention

The present invention relates to a fluid level measurement device that can easily and accurately measure both the high fluid level and the low fluid level for a body of fluid over a period of time.

2. Background of the Prior Art

The levels of most of the earth's navigable bodies of water are not constant but fluctuate between a low level or a low tide and a high level or a high tide. The variations in the levels are generated partly by the unhomogeneous gravitational fields of the moon, the Sun, and the planets of the solar system and partly by the deformation of the Earth. A second component that acts on tides are the gravitational effects of the water masses in oceans and seas moved by these water forces and the deformations of the Earth-due to weight of the water masses. As the tide levels are critical to a variety of interests, including navigation, boundaries, environmental assessments, and sea level change, obtaining accurate tide levels is critical. At least as early as 1807, when Thomas Jefferson created the Coast Survey to map and chart the country's coasts and harbors, there was a recognized need to accurately measure and record the tidal levels of our seas and oceans.

Today, the need for tidal measurement continues to be of great importance. Modern tidal measurement needs are not restricted to harbors and other shipping channels, but are necessary along the entire coast line of a body of water. One of the simplest methods to measure tide levels at a given location, is to have a person at the desired location with an appropriate measuring rod that is positioned against a fixed reference point, with the person taking readings at regular intervals. The problem with this method is that there is a substantial amount of time between high tide and low tide resulting in an underutilization of human capital. Additionally, many tidal measurements are performed across multiple tidal cycles which adds to the capital inefficiency and also leads to inattention and sloppiness by the measurement personal. On the other end of the spectrum, are a plethora of electronic measurement devices that automatically measure the tide levels. The problems with such devices is that they are extremely expensive and tend to be difficult to calibrate and operate. As several hundred measurements may need to be taken along a given stretch of coastline, these devices are either extremely expensive to implement or are very slow in their goal achievement as only one or maybe a handful of such devices are purchased and moved from location to location over a relatively long time span. Additionally, such devices, due to the harsh environment in which the devices operate, tend to require frequent and oftentimes expensive repairs.

Accordingly, there exists a need in the art for a device that quickly and accurately measures both the high water level and the low water level at a given location without the need for a technician to be present during the measurement cycle, which device is of relatively simple design and construction and is easy to use requiring little if any calibration to use. Such a device must be highly resistant to the harsh environment in which the device operates so that repairs are kept to a minimum.

SUMMARY OF THE INVENTION

The fluid level measurement device of the present invention addresses the aforementioned needs in the art. The fluid level measurement device measures the high level mark and the low level mark within a fluid body such as an ocean. Once the fluid level measurement device is properly installed, it requires no further technician involvement until readings are retrieved. The fluid level measurement device is of relatively simple design and construction and is easy to install and calibrate for use. The fluid level measurement device is highly resistant to the harsh elemental effects found in its operating environment such that the device is subject to relatively few breakdowns during normal use.

The fluid level measurement device is comprised of a housing that has a first top end, a first bottom end, a hollow interior, and a first opening located proximate the bottom end for allowing the fluid to enter the hollow interior and rise therein. A cap has a second opening attached to the top end of the housing. A shaft has a base and a top such that the shaft protrudes through the second opening of the cap and is capable of sliding up and down through the second opening and such that the base of the shaft is disposed within the hollow interior and the top is located exterior of the housing. A first ring encompasses the shaft, below the cap, and is capable of sliding along the shaft, while a second ring encompasses, the shaft, above the cap, and is capable of sliding along the shaft. A tube is attached to an outer surface of the housing, the tube having a second top end, a second bottom end, a third opening located proximate the second bottom end, and an amount of debris disposed within the tube. The first ring is positioned in abutting relationship with the cap and the second ring is positioned in abutting relationship with the cap and as the fluid enters the interior of the housing and rises within the interior, the shaft rises in lockstep with the rise in the fluid level such that the cap slides the first ring downwardly along the shaft toward the base and as the fluid level within the interior falls, the cap slides the second ring upwardly along the shaft toward the top and wherein when the fluid enters the third opening of the tube and rises within the tube toward the second top, some of the debris is carried upwardly toward the top by the fluid and deposited on an inner surface of the tube when the fluid recedes. A receptacle is located at the base of the shaft and is filled with the fluid for providing a buoyant weight for the shaft. A measurement gradient is located along a portion of the shaft. A mounting system is provided for attaching the housing to a fixed structure. An upper portion of the housing is clear. The tube is clear. A measurement gradient is also located along a portion of the tube. The debris within the tube may be cork dust.

BRIEF DESCRIPTION OF THE DRAWINGS

FIG. 1 is a perspective view of the fluid level measurement device of the present invention.

FIG. 2 is a perspective view of the float shaft used within the fluid level measurement device.

FIG. 3 is a close-up perspective view of the fluid level measurement device, with the fastening system not illustrated for clarity and brevity.

Similar reference numerals refer to similar parts throughout the several views of the drawings.

DESCRIPTION OF THE PREFERRED EMBODIMENT

Figure 4:
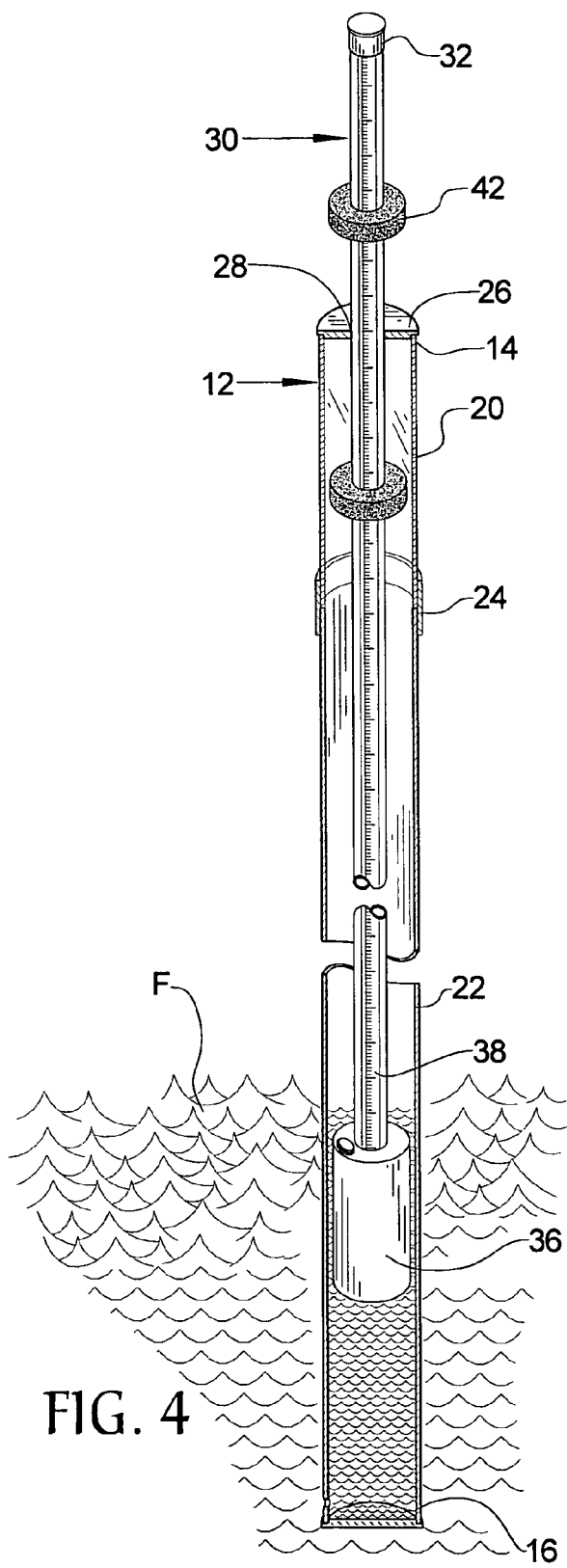
FIG. 4 is a sectional view of the fluid level measurement device taken along line 4-4 in FIG. 3.

Referring now to the drawings, it is seen that the fluid level measurement device of the present invention, generally denoted by reference numeral 10, is comprised of a hollow tubular housing 12 having a top end 14 and a bottom end 16, which may be capped, with an opening 18 located proximate the bottom end 16 for allowing fluid F to enter and leave the interior of the housing 12. The housing 12 may be of monolithic construction, or, as illustrated, may be made of two or more sections, such as an upper section 20 and a lower section 22 joined together by a collar 24, which may frictionally hold each section 20 and 22. By utilizing a multi-sectional design, service access to the interior of the housing 12 is easy to achieve and the upper section 20 may be made from a transparent material in order to allow visual access into the interior so as to be able to take quick measurements as more fully discussed below. A cap 26 has an opening 28 and is attached, removably or otherwise, to the top end 14 of the housing 12. A measurement shaft 30 is provided and has a top 32 and a bottom 34 with a receptacle 36 attached to the bottom 34, such that the receptacle 36 can be filled with a fluid F. A measurement gradient 38 is located along a length of the shaft 30. The shaft 30 is positioned such that it is partially disposed within the interior of the housing 12 with the receptacle 36 fully disposed within the housing 12. The shaft 30 protrudes through the opening 28 of the cap 26 such that the top of the shaft 30 terminates exterior of the housing 12. The shaft 30 is capable of sliding up and down through the opening 28 of the cap 26. A first ring 40 encompasses the shaft 30 and is positioned below the cap 26 while a second ring 42 encompasses the shaft 30 and is positioned above the cap 26. Each ring 40 and 42 is capable of sliding up and down along a length of the shaft 30.

The housing 12 and the shaft 30 can be made from any appropriate lightweight material such as plastic, PVC, etc. The receptacle 36 should be made from a material such that when the receptacle 36 is filled with the fluid F and the housing 12 has a level of fluid therein, the receptacle 36, with shaft 30 attached, is slightly buoyant in the fluid F. A lightweight plastic or similar material can be used to form the receptacle 36. The first ring 40 and second ring 42 should be made from a lightweight material that allows the rings 40 and 42 to slide along the shaft 30 with moderate force, yet not allow the rings 40 and 42 to slide simply under the force of gravity. A lightweight plastic or an open or closed cell foam or other similar material can be used to form the rings 40 and 42.

A debris tube 44 is attached to an exterior surface of the housing 12 in any appropriate fashion, such as be adhesive, etc., and has a bottom end 46 and a top end 48. An opening 50 is located on the debris tube 44 proximate its bottom end 46 for allowing the fluid F to enter therein. A measurement gradient 52 is provided on the outer surface of the housing 12 and coextends with the debris tube 44. The debris tube 44 is clear and has an amount of debris 54 therein such as cork dust, although other types of debris work satisfactory so long as the fluid F that enters the debris tube 44 through its opening 50 can carry the debris 54 upwardly within the debris tube 44 as the fluid F rises therein.

Figure 5:
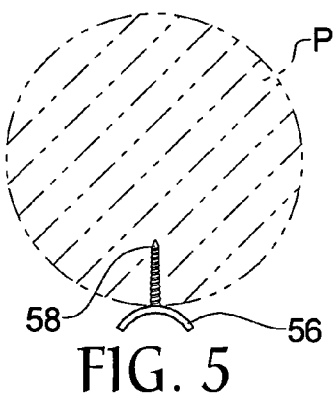
FIG. 5 is a top plan view illustrating the mounting of the top fastening system of the fluid level measurement device.
Figure 6:
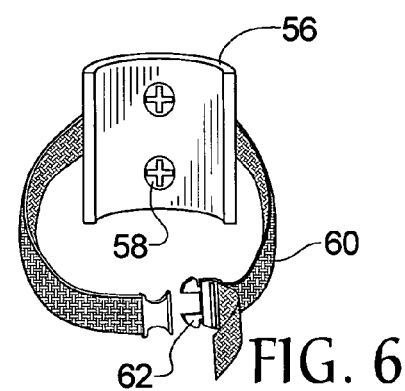
FIG. 6 is a perspective view of the top fastening system of the fluid measurement device.
Figure 7:
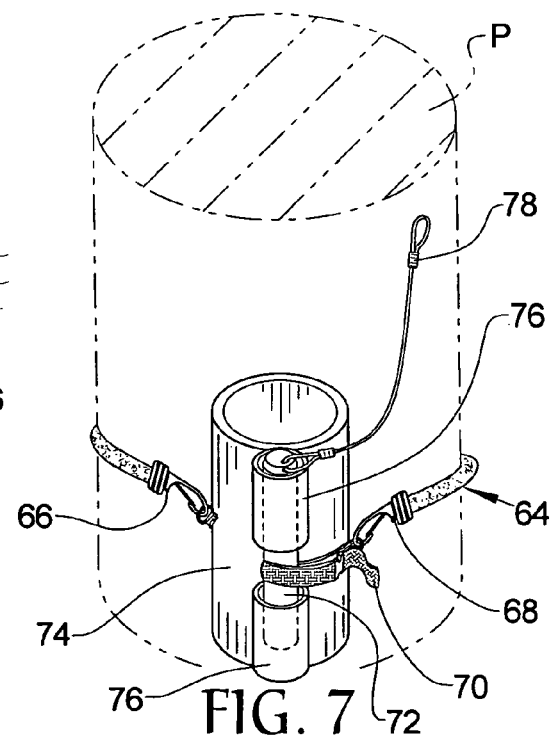
FIG. 7 is a perspective view of the bottom fastening system of the fluid level measurement device.

The fluid level measurement device 10 is attached to a desired structure, such as a piling P, in any appropriate fashion. FIGS. 5-7 illustrate an example of an attachment method. A bracket 56 is secured to the piling P by passing one or more screws 58 through the bracket 56 into the piling P. The bracket 56 has a shape that corresponds to the outer shape of the housing 12 for snugly receiving the housing 12 therein. A strap 60 having a quick disconnect buckle system 62 is attached to the bracket 56 and encompasses an upper portion of the housing 12 for securing the housing 12 at this upper portion. As specifically seen in FIG. 7, in attaching a lower portion of the housing 12 to the piling P, a sleeve 74 large enough to enclose the housing 12 and the attached debris tube 44 has a second strap 64 that is attached thereto by a first end 66, the second strap 64 encompasses the piling P. The second end 68 of the strap 64 encompasses, via a loop member 70, a lock pin 72 that is frictionally received within a two section receiver 76 located on the sleeve 74. A lanyard 78 is attached to the lock pin 72. When attachment of the lower portion of the housing 12 to the piling P is desired, the second strap 64 encompasses the piling P and the loop member 70 is placed over the lock pin 72. The lock pin 72 is inserted into the receiver 76. The loop member is positioned between the two sections of the receiver 76. Accordingly, the sleeve 74 is held in place against the piling P and the housing 12 and attached debris tube 44 are received within the sleeve 74. When detachment of the lower portion of the housing 12 from the piling P is desired, the lanyard 78 is grasped by a user and pulled upon to remove the lock pin 72 from the receiver 76. The lock pin 72 also looses the loop member 70 attached to the second strap 64 which allows the second end 68 of the second strap 64 to fall clear and unencompass the piling P allowing the sleeve 74 to become free of the piling P and thus allowing removal of the housing 12.

It is expressly understood that other attachment methods for attaching the fluid level measurement device 10 to a desired structure are possible in keeping within the scope and spirit of the present invention.

In order to use the fluid level measurement device 10 of the present invention, the housing 12 is attached to a desired structure in appropriate fashion. A lower portion of the housing 12 must be below the fluid line a sufficient distance so that at low tide, the fluids level within the housing 12 will be greater than the height of the receptacle 36. Additionally, the housing 12 must be positioned so that the opening 50 on the debris tube 44 is below the fluid line at low tide. Once the housing 12 is appropriately attached, the fluid F is allowed to enter the interior of the housing 12 through the housing's opening 18 and the fluid level is allowed equalize with the fluid level exterior of the housing 12. The first ring 40 is positioned just below the cap 26 while the second ring 42 is positioned just above the cap 26. The cap 26 is placed onto the top 14 of the housing 12. If necessary, the inner surface of the debris tube 44 is cleaned and the bottom of the debris tube 44 is filled with an appropriate debris 54, such as the above mentioned cork dust. The device 10 is now ready for use for taking fluid level measurements.

As fluid enters the opening 50 of the debris tube 44, the debris 54 within the debris tube floats upwardly with the rising fluid level. As the height of the fluid level peaks, some of the debris 54 within the debris tube is deposited on the inner surface of the debris tube 44. As the fluid level recedes, some of the debris 54 remains on the inner surface of the debris tube 44 at the point of the highest fluid level. This marks the upper fluid level height and a measurement is taken via the measurement gradient 52. Coincidentally, as the fluid level rises within the interior of the housing 12, the receptacle 36, by being slightly buoyant, rises with the rising fluid level. As the receptacle 36, so does the shaft 30 which pushes upwardly through the opening 28 on the cap 26. The cap 26 acts on the first ring 40 and pushes the first ring 40 downwardly along the shaft 30 toward the shaft's bottom 34 with upward shaft 30 movement. As the fluid level within the interior of the housing 12 falls, the receptacle 36 falls with the falling fluid level. The falling receptacle 36 causes the shaft to retract back downwardly through the opening 28 of the cap 26. Once the receptacle 36 has fallen a sufficient distance, and thus the shaft 30 has retracted a sufficient distance down through the opening 28 of the cap 26, the second ring 42 encounters the cap 26 and the cap 26 acts on the second ring 42 and pushes the second ring 42 upwardly toward the shaft's top 32 with downward shaft 30 movement. This system works equally well if initially after the device 10 becomes operational, the fluid level within the interior of the housing falls before rising. Once at least one full cycle of high tide and low tide have been achieved, the distance between the first ring 40 and the second ring 42 represent the height difference between the high tide and the low tide. The difference is easily measured by the measurement gradient 38 located along the shaft 30. As the height measurement within the debris tube 44 represents the high tide level, subtracting the height difference as measured by the first ring 40 and the second ring 42 from this high tide level represents the low tide level. In order to reuse the device 10, the housing 12 is detached from its attachment structure and reattached at its new measurement point. The debris tube 44 is cleaned, and if needed, refilled with additional debris 54, and the rings 40 and 42 are reset to be just above and just below the cap 26 respectively.

While the invention has been particularly shown and described with reference to an embodiment thereof, it will be appreciated by those skilled in the art that various changes in form and detail may be made without departing from the spirit and scope of the invention.

I claim:

1. A measurement device for measuring the fluid level of a fluid, the measurement device comprising:
    a housing having a top end, a bottom end, a hollow interior, and a first opening located proximate the bottom end for allow the fluid to enter the hollow interior;
    a cap having a second opening attached to the top end;
    a shaft having a base and a top such that the shaft protrudes through the second opening of the cap and is capable of sliding up and down through the second opening and such that the base is disposed within the hollow interior;
    a first ring encompassing the shaft and capable of sliding along the shaft, the first ring disposed below the cap;
    a second ring encompassing the shaft and capable of sliding along the shaft, the second ring disposed above the cap; and
    wherein the first ring is positioned in abutting relationship with the cap and the second ring is positioned in abutting relationship with the cap and as the fluid enters the interior of the housing and rises within the interior, the shaft rises in lockstep with the rise in the fluid level such that the cap slides the first ring downwardly along the shaft toward the base and as the fluid level within the interior falls, the cap slides the second ring upwardly along the shaft toward the top.

2. The measurement device as in claim 1 further comprising a receptacle located at the base of the shaft, the receptacle filled with the fluid for providing a buoyant weight for the shaft.

3. The measurement device as in claim 1 further comprising a measurement gradient located along a portion of the shaft.

4. The measurement device as in claim 1 further comprising a mounting system adapted to attached the housing to a fixed structure.

5. The measurement device as in claim 1 wherein an upper section of the housing is clear.

6. The measurement device as in claim 1 further comprising a debris tube attached to the an outer surface of the housing for measuring the upper level limit of the fluid.

7. The measurement device as in claim 6 wherein the debris tube is clear.

8. The measurement device as in claim 6 further comprising a measurement gradient located along side the debris tube.

9. A measurement device for measuring the fluid level of a fluid, the measurement device comprising:
    a housing having a first top end, a first bottom end, a hollow interior, and a first opening located proximate the bottom end for allowing the fluid to enter the hollow interior;
    a cap having a second opening attached to the top end;
    a shaft having a base and a top such that the shaft protrudes through the second opening of the cap and is capable of sliding up and down through the second opening and such that the base is disposed within the hollow interior;
    a first ring encompassing the shaft and capable of sliding along the shaft, the first ring disposed below the cap;
    a second ring encompassing the shaft and capable of sliding along the shaft, the second ring disposed above the cap;
    a tube attached to an outer surface of the housing, the tube having a second top end, a second bottom end, a third opening located proximate the second bottom end, and an amount of debris within the tube; and
    wherein the first ring is positioned in abutting relationship with the cap and the second ring is positioned in abutting relationship with the cap and as the fluid enters the interior of the housing and rises within the interior, the shaft rises in lockstep with the rise in the fluid level such that the cap slides the first ring downwardly along the shaft toward the base and as the fluid level within the interior falls, the cap slides the second ring upwardly along the shaft toward the top and wherein when the fluid enters the third opening of the tube and rises within the tube toward the second top, some of the debris is carried upwardly toward the top by the fluid and deposited on an inner surface of the tube when the fluid recedes.

10. The measurement device as in claim 9 further comprising a receptacle located at the base of the shaft, the receptacle filled with the fluid for providing a buoyant weight for the shaft.

11. The measurement device as in claim 9 further comprising a measurement gradient located along a portion of the shaft.

12. The measurement device as in claim 9 further comprising a mounting system adapted to attached the housing to a fixed structure.

13. The measurement device as in claim 9 wherein an upper section of the housing is clear.

14. The measurement device as in claim 9 wherein the tube is clear.

15. The measurement device as in claim 9 further comprising a measurement gradient located along side the tube.

16. The measurement device as in claim 9 wherein the debris is cork dust.

* * * * *